United States Patent [19]

Quintana

[11] 4,296,572
[45] Oct. 27, 1981

[54] DUST REMOVING ATTACHMENT DEVICE FOR AUTOMATIC AIR FILES

[76] Inventor: Pedro Quintana, 1920 E. Wilder Ave., Tampa, Fla. 33610

[21] Appl. No.: 84,330

[22] Filed: Oct. 12, 1979

Related U.S. Application Data

[62] Division of Ser. No. 887,517, Mar. 17, 1978, abandoned.

[51] Int. Cl.³ ............................................. B24B 55/06
[52] U.S. Cl. ................................. 51/170 TL; 51/273
[58] Field of Search .............. 51/170 R, 170 TL, 273, 51/170 MT

[56] References Cited

U.S. PATENT DOCUMENTS 3,785,092  1/1974  Hutchins ........................... 51/273 X

FOREIGN PATENT DOCUMENTS 1938350  2/1971  Fed. Rep. of Germany ... 51/170 TL

Primary Examiner—Nicholas P. Godici
Assistant Examiner—Roscoe V. Parker
Attorney, Agent, or Firm—Ernest H. Schmidt

[57] ABSTRACT

A dust removing attachment device for pneumatically driven straight-line power files wherein a continuous current of air is over the filing surface to entrain abraded particles by vacuum for capture in a dust bag is described. A portion of the pressurized air being supplied to the pneumatic file motor is utilized both to effect the particle entraining vacuum air current at a plurality of openings surrounding the file and to blow the particles into the dust bag.

5 Claims, 2 Drawing Figures

U.S. Patent
Oct. 27, 1981
4,296,572
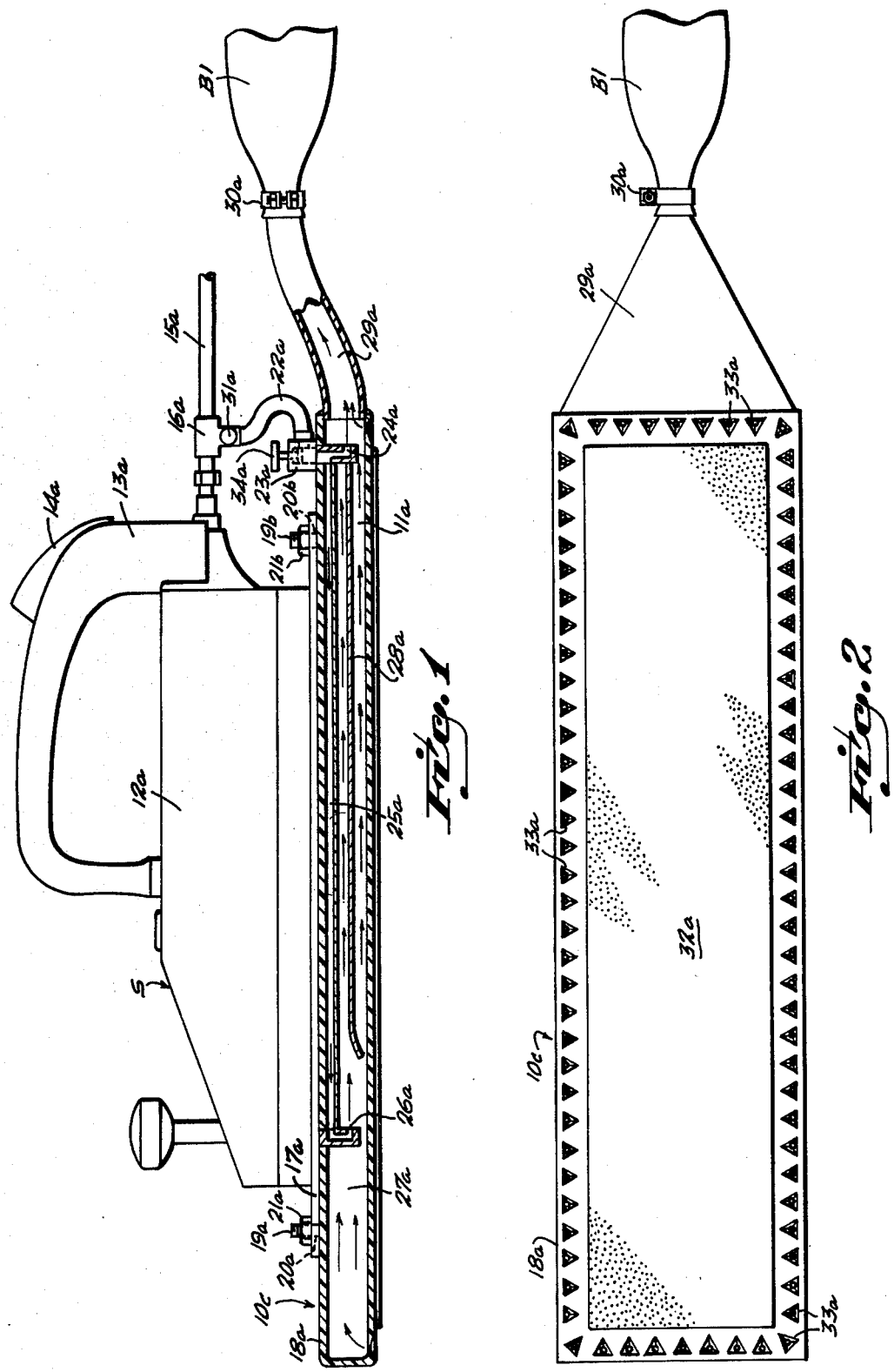

DUST REMOVING ATTACHMENT DEVICE FOR AUTOMATIC AIR FILES

This is a division of applicant's application Ser. No. 887,517 filed Mar. 17, 1978 and entitled "Dust Removing Attachment Device for Power Grinders" and now abandoned.

This invention relates to attachment devices for pneumatically driven straight-line power files or grinders, and is directed particularly to an attachment device for manually controlled files operative continuously to withdraw cut-away particles into a collection bag or the like to substantially eliminate air pollution as the result of such filing.

It is well known that pneumatically driven automatic files, particularly those having high speed reciprocative filing or grinding elements, throw off large volumes of abraded or cut-away particles in their operation. Depending on what material is being worked in the filing operation, such pollution presents a substantial health hazard to the operator of the filing tool and even to others in the surrounding area. Filing hazards are particularly evident, for example, in automatic and body paint shops, wherein the filing and sanding of paint, metals and synthetic filler resins constitutes a major part of the work being done.

In my U.S. Pat. No. 3,646,712, issued Mar. 7, 1972, I describe a dust-removing attachment device for electrically driven power grinders wherein pressurized air and vacuum lines are utilized, respectively, to entrain or capture and then withdraw the particle-polluted air for collection within a dust bag or remote canister. My present invention relates to improvements in the invention disclosed in that patent. The principal object of my present invention is to provide an improved dust-removing attachment device for power files, particularly pneumatically driven power files, wherein a portion of the pressurized air being supplied to drive the file motor is diverted and converted to a zone of reduced air pressure or vacuum utilized to withdraw a continuous, blanket-like current of air over the filing element for entraining and capturing particles of such filing.

Another object of the invention is to provide a dust removing attachment device for pneumatically driven files wherein an air jet tube discharging a portion of the pressurized air is utilized not only to provide the vaccum for withdrawing the dust particles, but also to establish reduced air pressure in a chamber leading from the filing sanding element zone to a particle collecting bag.

A more particular object of the invention is to provide a dust removing attachment device of the above nature wherein a substantially hollow rectangular shoe is removably attachable to the sole plate of the air file as a replacement for its standard shoe, the replacement shoe embodying the invention comprising a plurality of peripherally spaced openings in its underside and means controlled by a portion of the pressurized air being supplied to the file driving motor for establishing a vacuum within the replacement shoe for withdrawing air blanketing the underside of the shoe and its grinding surface element, together with entrained particles of sanding or grinding through the openings into the interior of the shoe for passage into a dust bag communicating with the interior at one end of the replacement shoe.

Still another object of the invention is to provide a dust removing attachment device of the character described which will be simple in construction, inexpensive to manufacture, light in weight, durable in use, and readily adaptable to pneumatically driven rotary reciprocating sanders and grinders of various sizes and design.

Other objects, features and advantages of the invention will be apparent from the following description when read with reference to the accompanying drawings. In the drawings, wherein like reference numerals denote corresponding parts throughout the several views:

FIG. 1 illustrates, partially in vertical cross-section, a dust removing attachment device for use with straight-line or orbital pneumatically driven tools; and FIG. 2 is a bottom view of the straight-line power sander and dust removing attachment device assembly shown in FIG. 1.

Referring now in detail to the drawings, FIGS. 1 and 2 illustrate a preferred form of attachment device designated, generally, by reference numeral 10c, for use in association with a typical manually-controlled, pneumatically-driven, portable straight-line sander or grinder S. The attachment device 10c is operative to pneumatically withdraw ground, sanded or abraded away particles of the work-piece being operated upon during use of the straight-line sander by carrying away such dust and airborne particles through a vacuum chamber 11a leading to an associated dust bag B1.

A typical manually held and controlled, pneumatically driven straight-line sander S with which the dust removing attachment device 10c is particularly well-suited for use comprises a motor housing 12a having a hand grip handle 13a fitted with an associated valve-actuated lever 14a for controlling the supply of compressed air leading to the motor from flexible compressed air line 15a (partially shown) connected to the motor 12a through T-fitting 16a. It will be understood that the energizing source of compressed air supplied through line 15a is controlled by the valve lever 14a in starting and stopping operation of the sander motor in the usual manner. The sander motor serves to reciprocatively actuate the flat sole plate 17a to which the attachment device 10c is secured in substitution for the usual sanding shoe.

The dust removing attachment device 10c, which may, for example, be integrally molded for the most part of a tough, rigid, shock-resistant synthetic plastic material for economy of manufacture and lightness of weight, comprises a hollow rectangular shoe member 18a fitted with studs 19a, 19b extending outwardly of the upper surface thereof and adapted to extend through shoe attachment openings 20a, 20b in the sander sole plate 17a for secure attachment to said sole plate by the use of nuts 21a, 21b.

As illustrated in FIG. 1, a portion of the compressed air being supplied to the sander motor S is diverted through T-fitting 16a and flexible conduit 22a to supply compressed air through fitting 23a to a rearwardly-directed jet opening 24a immediately to the rear of the vacuum chamber 11a. The fitting 23a also communicates through internal passageway 25a with a forwardly-located, rearwardly-directed jet opening 26a serving to enhance the degree of vacuum created thereby at the forward interior porton of the shoe member 18a, as indicated at 27a. A substantially centrally located interior, side-to-side horizontal partition wall 28a extends from a position just forward of the jet opening 26a to a position immediately to the rear of the rear jet opening 24a. The rear end of the shoe member 18a communicates with the dust bag B1 through a fan-shaped, converging, vertically off-set connector conduit 29a, said dust bag being removably secured to the outer end of said conduit as by screw clamp 30a. A thumb screw valve 31a in the branch arm of the T-fitting 16a provides for manual control of the air pressure being supplied to the jets 24a and 26a.

As best illustrated in FIG. 2, the sanding or grinding or filing sheet 32a is preferably supplied with a pressure sensitive adhesive backing by means of which it is attached to the undersurface of the rectangular shoe member 18a, the rectangular size thereof being such as to leave exposed a marginal peripheral portion of said undersurface. As best illustrated in FIG. 1, such marginal exposed portion of the shoe member 18a is provided with aplurality of closely spaced, recessed opengings 33a through which air polluted by sanding, grinding or filling operations is drawn by the vacuum created within said shoe member as a result of the air jet streams from the internal jet openings 24a and 26a. The surface depressions of the through openings 33a are preferably triangular in shape, as illustrated, with apices directed inwardly toward adjacent edges of the sanding sheet 32a. In operation, it will be understood that the jet stream 26a directed into the forward opening above the horizontal partition 28a will serve to enhance the partial vacuum created within the forward end of the shoe member 18a whereas the rearward jet 24a serves to effect the greater part of the partial vacuum created within the rearward portion of said shoe member to effect more or less uniform suction action through the peripheral through openings 33a for effectively withdrawing dust particles with substantially equal efficiency all around the outer periphery of the sand paper sheet during abrading operations. A thumb-screw control valve 34a in fitting 23a serves to control the relative division of compressed air to the two jets 24a, 26a for achieving uniformity of vacuum suction through the peripheral openings 33a of the shoe member 18a. The pressurized air stream passing rearwardly from jet 24a into the neck of the bag B1 inflates the bag and passes through its porous fabric, leaving the captured particles behind for disposal from time to time upon emptying the bag.

While I have illustrated and described herein one form in which my invention can conveniently be embodied in practice, it is to be understood that this form is presented by way of example only and not in a limiting sense. The invention, in brief, comprises all the modifications and embodiments coming within the scope and spirit of the following claims.

What I claim as new and desire to secure by Letters Patent is:

1. A dust removing attachment device for pneumatically driven straight-line power files of the type having a reciprocative sole plate comprising, in combination, an elongated, rectangular replacement shoe member, means for removably attaching a flat upper surface portion of said replacement shoe member to said sole plate, said shoe member being substantially hollow to define an end-to-end internal chamber, the underside of said shoe member being formed with a plurality of peripherally-spaced through openings, means energized by pressurized air for creating a vacuum in said chamber operative to withdraw air peripherally from the underside of said shoe member into said vacuum chamber together with abraded particles generated upon use of the automatic air file, a dust bag communicating with one end of said replacement shoe member, said vacuum creating means comprising an air jet directed into the interior of said dust bag through said one end of said dust bag for inflating it with dust-carrying air from said vacuum chamber, said air jet being disposed adjacent said one end of said replacement shoe member, and a second air jet within said vacuum chamber and longitudinally spaced from said first mentioned air jet.

2. A dust removing attachment device for pneumatically driven straight-line ower files as defined in claim 1 including a transversely extending, side-to-side partition wall within said rectangular shoe member, said partition wall defining upper and lower vacuum sub-chambers, said partition wall extending short of the other end of said replacement shoe member, and said second air jet being disposed forwardly of the forward end of said partition wall so as to direct the pressurized air from said second air jet into said upper vacuum sub-chamber.

3. A dust removing attachment device for pneumatically driven straight-line power files as defined in claim 2 wherein said means for creating the vacuum in said chamber further comprises conduit means communicating between said air jets and the source of actuating air pressure being supplied to the associated pneumatically driven straight-line power file.

4. A dust removing attachment device for pneumatically driven straight-line power files as defined in claim 3 including a pressure adjustment valve in said conduit means.

5. A dust removing attachment device for pneumatically driven straight-line power files as defined in claim 4 wherein each of said plurality of peripherally spaced through openings comprises a depression defining an isosceles triangle the base of which extends parallel with the pertaining outer edge of the underside of said shoe member.

* * * * *